US009862270B2

(12) United States Patent
Maeda

(10) Patent No.: US 9,862,270 B2
(45) Date of Patent: Jan. 9, 2018

(54) CONTROL DEVICE FOR FOUR WHEEL DRIVE VEHICLE

(71) Applicant: TOYOTA JIDOSHA KABUSHIKI KAISHA, Toyota-shi, Aichi-ken (JP)

(72) Inventor: Yoshinori Maeda, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/312,831

(22) PCT Filed: May 26, 2015

(86) PCT No.: PCT/IB2015/000738
§ 371 (c)(1),
(2) Date: Nov. 21, 2016

(87) PCT Pub. No.: WO2015/181607
PCT Pub. Date: Dec. 3, 2015

(65) Prior Publication Data
US 2017/0113546 A1 Apr. 27, 2017

(30) Foreign Application Priority Data
May 29, 2014 (JP) .................................. 2014-111782

(51) Int. Cl.
B60K 23/04 (2006.01)
B60K 17/35 (2006.01)
(52) U.S. Cl.
CPC .......... *B60K 23/04* (2013.01); *B60K 17/3515* (2013.01); *B60K 2023/043* (2013.01);
(Continued)

(58) Field of Classification Search
CPC ................ B60K 17/3515; B60K 23/04; B60K 2023/043
See application file for complete search history.

(56) References Cited

U.S. PATENT DOCUMENTS 5,103,690 A * 4/1992 Macpherson ...... B60K 17/3505
180/233
6,817,434 B1 * 11/2004 Sweet ................ B60K 23/0808
180/197

(Continued)

FOREIGN PATENT DOCUMENTS

| JP | H06-115373 A | 4/1994 |
| JP | 2010-100280 A | 5/2010 |
| JP | 2014-043143 A | 3/2014 |

*Primary Examiner* — Edwin A Young
(74) *Attorney, Agent, or Firm* — Oliff PLC

(57) ABSTRACT

A control device for a four wheel drive vehicle. Differential limitation is applied to both of right and left rear wheels, with 2WD_d state being maintained, by executing two wheel control for engaging or half-engaging a first clutch and a second clutch. As the two wheel drive control is executed, a moment that suppresses the rotation speed difference between the right and left rear wheels acts on the right and left rear wheels even in the 2WD_d state. When the rotation speed difference occurs between the right and left rear wheels, a braking force is allowed to act on the vehicle wheel on the high rotation side and a driving force is allowed to act on the vehicle wheel on the low rotation side through the execution of the two wheel drive control so that a stable moment acts on the vehicle without a transition to a 4WD state.

9 Claims, 6 Drawing Sheets

(52) U.S. Cl.
CPC ..... *B60Y 2300/022* (2013.01); *B60Y 2300/42* (2013.01); *B60Y 2300/52* (2013.01); *Y02T 10/52* (2013.01)

(56) References Cited

U.S. PATENT DOCUMENTS

| | | |
|---|---|---|
| 2007/0034441 A1 | 2/2007 | Pelchen et al. |
| 2010/0094519 A1 | 4/2010 | Quehenberger et al. |
| 2013/0098201 A1* | 4/2013 | Suzuki .................. F16H 37/06 74/665 F |

* cited by examiner

CONTROL DEVICE FOR FOUR WHEEL DRIVE VEHICLE

BACKGROUND OF THE INVENTION

1. Field of the Invention

The invention relates to a control device for a four wheel drive (i.e. 4WD) vehicle that is provided with a disconnection mechanism for the connection/disconnection of a power transmission path for transmitting power of a driving force source to auxiliary driving wheels and right and left clutches disposed in respective power transmission paths to both of the right and left auxiliary driving wheels.

2. Description of Related Art

A 4WD vehicle is widely known that is provided with a disconnection mechanism for the disconnection of a power transmission path for transmitting a part of power of a driving force source transmitted to main driving wheels to auxiliary driving wheels, which become driven wheels during two wheel driving (i.e. 2WD), during 4 wheel drive (i.e. 4WD) and a first clutch and a second clutch disposed in respective power transmission paths to the right and left auxiliary driving wheels. One of the examples is the vehicle that is disclosed in Japanese Patent Application Publication No. 2010-100280 (JP 2010-100280A). JP 2010-100280A discloses a 4WD vehicle that is provided with a disconnection mechanism (dog clutch) on the front wheels side and is provided with two multi-plate clutches on the rear wheels side. According to JP 2010-100280A, the dog clutch and the two multi-plate clutches are released during 2WD so that the rotation of a torque transmission section (corresponding to a propeller shaft) or the like between the clutches (dog clutch and multi-plate clutches) is stopped for fuel economy improvement and the two multi-plate clutches can be separately controlled during 4WD when the clutches are engaged so that the differential function of a differential gear is realized by the two multi-plate clutches without any rear differential gear.

In the vehicle that is disclosed in JP 2010-100280A, the 2WD state and the 4WD state are alternatively switched. In general, switching to the 4WD state is carried out in the event of wheel slip, a strong acceleration request from a driver, or the like as disclosed in JP 2010-100280A. Switching to the 4WD state that is carried out to improve the straight traveling stability of the vehicle against a disturbance such as a road surface disturbance and crosswind is also considerable apart from this. However, more-than-necessary switching to the 4WD state for the improvement of the straight traveling stability of the vehicle despite an acceleration request which is not strong as in steady traveling (constant-speed traveling) is likely to result in fuel economy deterioration. Also, if the 2WD state is maintained for a long period of time for fuel economy improvement despite the occurrence of a disturbance, it may be impossible to promptly improve the straight traveling stability of the vehicle against the disturbance. The above-described problems are not known, and no technique for improving straight traveling stability against a disturbance and suppressing fuel economy deterioration at the same time has been proposed.

SUMMARY OF THE INVENTION

The invention, which has been made in view of the above, provides a control device for a four wheel drive vehicle that is capable of improving fuel economy and straight traveling stability at the same time.

According to an aspect of the invention, there is provided a control device for a four wheel drive vehicle. The four wheel drive vehicle includes disconnection mechanism, a first clutch, and a second clutch. The disconnection mechanism is configured to connect/disconnect power transmission path transmitting a part of power of a driving force source transmitted to main driving wheels to auxiliary driving wheels during four wheel drive of the four wheel drive vehicle, and the first clutch is provided to be disposed in one of power transmission path between the disconnection mechanism and both of right and left wheels of the auxiliary driving wheels. Likewise, the second clutch is disposed in the other one of the power transmission path between the disconnection mechanism and both of the right and left wheels of the auxiliary driving wheels. The control device for a four wheel drive vehicle comprises a electronic control unit. The electronic control unit is configured to (a) switch an operation state of the disconnection mechanism, the first clutch, and the second clutch in accordance with a traveling state of the four wheel drive vehicle, and (b) execute a two wheel drive (i.e. 2WD) control for engaging or half-engaging the first clutch and the second clutch, based on the traveling state of the four wheel drive vehicle, with a two wheel drive state where the disconnection mechanism are released being maintained.

According to the control device for a four wheel drive vehicle described above, a differential limitation can be applied to both of the right and left auxiliary driving wheels, with the two wheel drive state being maintained, by executing the two wheel drive control for engaging or half-engaging the first clutch and the second clutch. As the two wheel drive control is executed, a moment that suppresses the rotation speed difference between the right and left auxiliary driving wheels acts on the right and left auxiliary driving wheels even in the two wheel drive state. In other words, when the rotation speed difference occurs between the right and left auxiliary driving wheels, a braking force is allowed to act on the vehicle wheel on the high rotation side and a driving force is allowed to act on the vehicle wheel on the low rotation side through the execution of the two wheel drive control so that a stable moment acts on the four wheel drive vehicle without a transition to a four wheel drive state where the disconnection mechanism is engaged. Accordingly, both fuel economy and straight traveling stability can be improved at the same tune.

In the control device, the traveling state of the four wheel drive vehicle may be a traveling state relating to the straight traveling stability of the four wheel drive vehicle. The electronic control unit may be configured to execute the two wheel drive clutch engagement control in a case where the traveling state relating to the straight traveling stability of the four wheel drive vehicle has become a state subjected to a predetermined disturbance or in a case where the traveling state relating to the straight traveling stability of the four wheel drive vehicle has become a state predicted to be subjected to the predetermined disturbance. According to the control device described above, the differential limitation can be applied to both of the right and left auxiliary driving wheels, with the two wheel drive state being maintained, when the traveling state has become the state subjected to the predetermined disturbance. Accordingly, the straight traveling stability can be improved without a transition to the four wheel drive state.

In the control device described above, the electronic control unit may be configured to execute the two wheel drive control in a case where a driving demand from a driver of the four wheel drive vehicle is within a predetermined range. According to the control device described above, the differential limitation can be applied to both of the right and left auxiliary driving wheels, with the two wheel drive state being maintained, in a case where the driving demand is within a predetermined range with the transition to the four wheel drive state not clearly needed. Accordingly, the stable moment acts on the four wheel drive vehicle while the fuel economy deterioration that is attributable to a transition to the four wheel drive state is suppressed.

In the control device described above, the electronic control unit may be configured to execute the two wheel drive control by engaging or half-engaging the first clutch and the second clutch at the same time with the two wheel drive state being maintained. According to the control device described above, an appropriate differential limitation can be applied to both of the right and left auxiliary driving wheels by the execution of the two wheel drive control.

In the control device described above, the electronic control unit may be configured to execute the two wheel drive control by respectively engaging or half-engaging the first clutch and the second clutch, with the two wheel drive state being maintained, at clutch torques calculated based on the respective rotation speeds of the auxiliary driving wheels. According to the control device described above, an appropriate differential limitation can be applied to both of the right and left auxiliary driving wheels by the execution of the two wheel drive control.

In the control device described above, the electronic control unit may be configured to execute the two wheel drive control by engaging or half-engaging one of the first clutch and the second clutch disposed on the power transmission path between the disconnection mechanism and the auxiliary driving wheels prior to the other one of the first clutch and the second clutch. Here, the first clutch and the second clutch are disposed between the disconnection mechanism and the auxiliary driving wheels, and a rotation speed of the one of the auxiliary driving wheels is higher than a rotation speed of the other of the auxiliary driving wheels. According to the control device described above, the braking force acts on the vehicle wheel on the high rotation side first and then the driving force acts on the vehicle wheel on the low rotation side by the execution of the two wheel drive control. Accordingly, a stable moment acts appropriately on the four wheel drive vehicle.

In the control device for a four wheel drive vehicle described above, the four wheel drive vehicle may further include a transfer and a driving force transmission shaft. The transfer may be configured to distribute a part of the power of the driving force source to the auxiliary driving wheels. The driving force transmission shaft may be configured to transmit the power from the driving force source distributed by the transfer to the auxiliary driving wheels. The disconnection mechanism may include a third clutch and a fourth clutch. The third clutch may be disposed on the driving force source side of the driving force transmission shaft. The fourth clutch may be disposed on the auxiliary driving wheels side of the driving force transmission shaft. The electronic control unit may be configured to release the disconnection mechanism by releasing at least one of the third clutch and the fourth clutch. According to the control device described above, the two wheel drive state is realized by releasing at least one of the third clutch and the fourth clutch. In the two wheel drive state where both the third clutch and the fourth clutch are released, the rotation of the rotating member (for example, the driving force transmission shaft or the like) between the third clutch and the fourth clutch can be substantially stopped. Accordingly, fuel economy can be further improved.

In the control device for a four wheel drive vehicle described above, one of the third clutch and the fourth clutch may be configured to be a dog clutch and the other one of the third clutch and the fourth clutch may be configured to be a dog clutch to which a synchronization mechanism is attached or a friction clutch. The electronic control unit may be configured to engage the other one of the third clutch and the fourth clutch first in a case where a transition is carried out from a state where the two wheel drive control is executed in the two wheel drive state where both the third clutch and the fourth clutch are released to a four wheel drive state where both the third clutch and the fourth clutch are engaged. According to the control device described above, the rotation speeds of the relative rotation members of the one clutch are substantially synchronized with each other and the one clutch can be engaged as the other clutch is engaged during the execution of the two wheel drive control. Accordingly, a transition to the four wheel drive state can be appropriately executed during the two wheel drive control.

In the control device for a four wheel drive vehicle described above, both the third clutch and the fourth clutch may be configured to be dog clutches. The electronic control unit may be configured to engage the fourth clutch prior to the initiation of the two wheel drive clutch engagement control in a case where the two wheel drive control is executed in the two wheel drive state where both the third clutch and the fourth clutch are released. According to the control device described above, the fourth clutch can be engaged in a state where the rotation speeds of the relative rotation members of the fourth clutch are substantially synchronized with each other (substantially zero rotation). During the execution of the two wheel drive control, the rotation speeds of the relative rotation members of the third clutch are substantially synchronized with each other. Accordingly, a transition to the four wheel drive state can be carried out by the engagement of the third clutch during the two wheel drive control.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, embodiments of the invention will be described in detail with reference to the accompanying drawings. A first embodiment of the invention will be described first.

Figure 1:
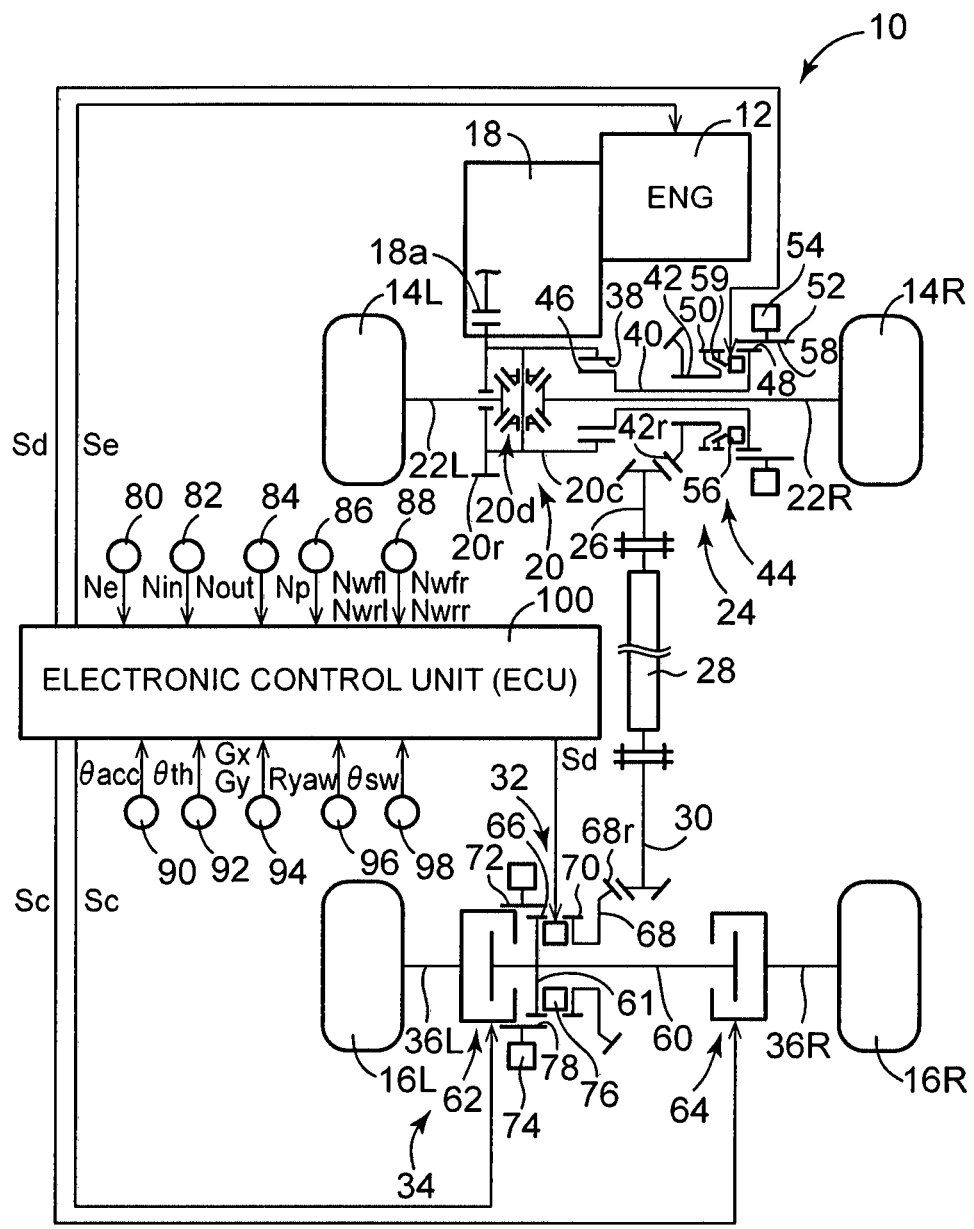
FIG. 1 is a skeleton diagram showing a schematic configuration of a four wheel drive (i.e. 4WD) vehicle to which the invention is applied and is a diagram showing a main part of a control system of the vehicle.

FIG. 1 is a skeleton diagram showing a schematic configuration of a four wheel drive (i.e. 4WD) vehicle 10 (hereinafter, referred to as a vehicle 10) to which the invention is applied. Also, FIG. 1 is a diagram showing a main part of a control system for various types of control in the vehicle 10. According to FIG. 1, the vehicle 10 is provided with an engine 12, right and left front wheels 14R, 14L (hereinafter, referred to as front wheels 14 if not particularly distinguished), right and left rear wheels 16R, 16L (hereinafter, referred to as rear wheels 16 if not particularly distinguished), a first power transmission path that is a power transmission path between the engine 12 and the front wheels 14 and transmits the power of the engine 12 to the front wheels 14, a second power transmission path that is a power transmission path between the engine 12 and the rear wheels 16 and transmits the power of the engine 12 to the rear wheels 16, and the like.

The engine 12 is an internal combustion engine such as a gasoline engine and a diesel engine. The engine 12 is a driving force source that generates a driving force. The front wheels 14 are main driving wheels that function as driving wheels in both a two wheel drive (i.e. 2WD) state and a 4WD state. The rear wheels 16 are auxiliary driving wheels that function as driven wheels in the 2WD state and function as driving wheels in the 4WD state to which the power from the engine 12 is transmitted via the second power transmission path. Accordingly, the vehicle 10 is a FF-based 4WD vehicle.

The first power transmission path is provided with a transmission 18, a front differential gear 20, right and left front wheel axles 22R, 22L (hereinafter, referred to as front wheel axles 22 if not particularly distinguished), and the like. The second power transmission path is provided with the transmission 18, a transfer 24 that is a front-rear wheel power distribution device which distributes a part of the power of the engine 12 transmitted to the front wheels 14 to the rear wheels 16, a driven pinion 26, a propeller shaft 28 that is a driving force transmission shaft which transmits the power from the engine 12 distributed by the transfer 24 to the rear wheels 16, a drive pinion 30, a rear side clutch 32, a right-left driving force distribution device 34, right and left rear wheel axles 36R, 36L (hereinafter, referred to as rear wheel axles 36 if not particularly distinguished), and the like.

The transmission 18 constitutes a part of a power transmission path that is common to the first power transmission path between the engine 12 and the front wheels 14 and the second power transmission path between the engine 12 and the rear wheels 16 and transmits the power of the engine 12 to the front wheels 14 side and the rear wheels 16 side. The transmission 18 is an automatic transmission such as a known planetary gear-type multi-speed transmission in which a plurality of gear stages (gearshift stages) having different gear ratios (transmission gear ratios) γ (=transmission input rotation speed Nin/transmission output rotation speed Nout) are selectively established, a known continuously variable transmission in which the gear ratios γ change steplessly and continuously, and a known synchromesh-type parallel two-shaft transmission.

The front differential gear 20 is configured to include a case 20c and a differential mechanism 20d that has a bevel gear. The front differential gear 20 is a known differential gear that transmits rotation while applying an appropriate differential rotation to the right and left front wheel axles 22R, 22L. A ring gear 20r is formed in the case 20c. The ring gear 20r meshes with an output gear 18a that is an output rotating member of the transmission 18. Accordingly, the power that is output from the transmission 18 is input to the ring gear 20r. In addition, inner circumferential fitting teeth 38 that are fitted into outer circumferential fitting teeth 46 (described later) are formed in the case 20c.

The transfer 24 is disposed in parallel to the front differential gear 20 as a rotating member that constitutes a part of the first power transmission path and is connected to the front differential gear 20. The transfer 24 is configured to include a first rotating member 40, a second rotating member 42, and a front side clutch 44.

The first rotating member 40 has a substantially cylindrical shape. The front wheel axle 22R penetrates an inner circumferential side of the first rotating member 40. The outer circumferential fitting teeth 46 are formed on one axial side of the first rotating member 40. The first rotating member 40 integrally rotates with the case 20c of the front differential gear 20 as the outer circumferential fitting teeth 46 are fitted into the inner circumferential fitting teeth 38. Clutch teeth 48 that constitute a part of the front side clutch 44 are formed on the other axial side of the first rotating member 40.

The second rotating member 42 has a substantially cylindrical shape. The front wheel axle 22R and the first rotating member 40 penetrate an inner circumferential side of the second rotating member 42. A ring gear 42r that is used to transmit the power of the engine 12 to the rear wheels 16 side and meshes with the driven pinion 26 is formed on one axial side of the second rotating member 42. Clutch teeth 50 that constitute a part of the front side clutch 44 are formed on the other axial side of the second rotating member 42. The driven pinion 26 that meshes with the ring gear 42r is connected to the propeller shaft 28 and is connected to the drive pinion 30 via the propeller shaft 28.

The front side clutch 44 is a clutch for selective connection/disconnection between the first rotating member 40 and the second rotating member 42. The front side clutch 44 is a dog clutch (that is, a mesh clutch) that is configured to include the clutch teeth 48, the clutch teeth 50, a sleeve 52, a holding member 54, and a front side actuator 56. The sleeve 52 has a substantially cylindrical shape. Inner circumferential teeth 58 that can mesh with the clutch teeth 48 and the clutch teeth 50 are formed on an inner circumferential side of the sleeve 52. The sleeve 52 is axially moved by the front side actuator 56 that can be, for example, electrically (electromagnetically) controlled by an electronic control unit 100. In addition, the front side clutch 44 is a dog clutch, to which a synchronization mechanism (synchromesh mechanism) is attached, including a synchronizer ring 59 that hampers a movement of the sleeve 52 toward the second rotating member 42 when the sleeve 52 and the second rotating member 42 rotate in an asynchronous state. The synchronizer ring 59 is a synchronizer device (synchronization mechanism) that synchronizes the inner circumferential teeth 58 and the clutch teeth 50 of the sleeve 52 with each other when the inner circumferential teeth 58 and the clutch teeth 50 of the sleeve 52 mesh with each other.

FIG. 1 illustrates a state where the front side clutch 44 is released. In this state, the connection between the first rotating member 40 and the second rotating member 42 is cut off, and thus the power of the engine 12 is not transmitted to the rear wheels 16. If the sleeve 52 is moved and both the clutch teeth 48 and the clutch teeth 50 mesh with the inner circumferential teeth 58, the front side clutch 44 is engaged and the first rotating member 40 and the second rotating member 42 are connected to each other. Accordingly, when the first rotating member 40 rotates, the second rotating member 42, the driven pinion 26, the propeller shaft 28, and the drive pinion 30 rotate in conjunction.

The right-left driving force distribution device 34 is disposed between the rear side clutch 32 and the rear wheels 16. The right-left driving force distribution device 34 performs torque transmission between the rear side clutch 32 and the rear wheels 16 and changes driving force distribution for the right and left rear wheels 16R, 16L. The right-left driving force distribution device 34 is configured to include an intermediate shaft 60 that is disposed between the right and left rear wheel axles 36R, 36L, an input gear 61 that is disposed not to be capable of rotating relative to the intermediate shaft 60, a first coupling 62 that is disposed between the intermediate shaft 60 (input gear 61) and the rear wheel 16L (rear wheel axle 36L), and a second coupling 64 that is disposed between the intermediate shaft 60 (input gear 61) and the rear wheel 16R (rear wheel axle 36R). The input gear 61 is a common input rotating member that transmits the power of the engine 12 to the first coupling 62 and the second coupling 64. Clutch teeth 66 that constitute a part of the rear side clutch 32 are formed at an outer circumference of the input gear 61. The first coupling 62 is, for example, a known electronically-controlled coupling that is configured to have a wet multi-plate clutch as a friction clutch. The driving force that is transmitted to the rear wheel 16L is controlled as the transmission torque (clutch torque) of the first coupling 62 is controlled. Specifically, when a current is supplied to an electromagnetic solenoid (not illustrated) that controls the transmission torque of the first coupling 62, the first coupling 62 is engaged with an engagement force proportional to the current value. The driving force that is transmitted to the rear wheel 16L increases as a result of an increase in the transmission torque of the first coupling 62. The second coupling 64 is, for example, a known electronically-controlled coupling that is configured to have a wet multi-plate clutch as a friction clutch. The driving force that is transmitted to the rear wheel 16R is controlled as the transmission torque of the second coupling 64 is controlled. Specifically, when a current is supplied to an electromagnetic solenoid (not illustrated) that controls the transmission torque of the second coupling 64, the second coupling 64 is engaged with an engagement force proportional to the current value. The driving force that is transmitted to the rear wheel 16R increases as a result of an increase in the transmission torque of the second coupling 64.

The right-left driving force distribution device 34 can continuously change the torque distribution for the right and left rear wheels 16R, 16L within a range of, for example, 0:100 to 100:0 by controlling the transmission torque of the first coupling 62 and the transmission torque of the second coupling 64. In addition, the right-left driving force distribution device 34 can continuously change the torque distribution for the front wheels 14 and the rear wheels 16 within a range of, for example, 100:0 to 50:50 by controlling the transmission torque of the first coupling 62 and the transmission torque of the second coupling 64. In addition, the right-left driving force distribution device 34 can allow a rotation speed difference between the right and left rear wheels 16R, 16L by controlling the transmission torque of the first coupling 62 and the transmission torque of the second coupling 64. Accordingly, no differential gear such as the front differential gear 20 (differential mechanism 20d) is provided on the rear wheels 16 side.

The vehicle 10 is also provided with a power transmission member 68 between the drive pinion 30 and the rear side clutch 32. The power transmission member 68 has a substantially cylindrical shape. The intermediate shaft 60 penetrates an inner circumferential side of the power transmission member 68. A ring gear 68r that meshes with the drive pinion 30 is formed on one axial side of the power transmission member 68 so as to receive the power of the engine 12 that is transmitted from the front wheels 14 side. Clutch teeth 70 that constitute a part of the rear side clutch 32 are formed on the other axial side of the power transmission member 68.

The rear side clutch 32 is disposed between the power transmission member 68 and the input gear 61. The rear side clutch 32 is a clutch for a selective connection/disconnection of the power transmission path between the power transmission member 68 and the input gear 61. The rear side clutch 32 is a dog clutch that is configured to include the clutch teeth 66, the clutch teeth 70, a sleeve 72, a holding member 74, and a rear side actuator 76. The sleeve 72 has a substantially cylindrical shape. Inner circumferential teeth 78 that can mesh with the clutch teeth 66 and the clutch teeth 70 are formed on an inner circumferential side of the sleeve 72. The sleeve 72 is axially moved by the rear side actuator 76 that can be, for example, electrically (electromagnetically) controlled. In addition, the rear side clutch 32 may be provided with a synchronization mechanism.

FIG. 1 illustrates a state where the rear side clutch 32 is released. In a state where the inner circumferential teeth 78 do not mesh with the clutch teeth 66 and the clutch teeth 70 as in this state, the connection between the power transmission member 68 and the input gear 61 is cut off and the power transmission path between the drive pinion 30 and the right-left driving force distribution device 34 is cut off, and thus the power of the engine 12 is not transmitted to the right-left driving force distribution device 34. If the sleeve 72 is moved and both the clutch teeth 66 and the clutch teeth 70 mesh with the inner circumferential teeth 78, the rear side clutch 32 is engaged and the power transmission member 68 and the input gear 61 are connected to each other. Accordingly, if the power of the engine 12 is transmitted to the drive pinion 30, the power is transmitted to the right-left driving force distribution device 34.

As described above, each of the front side clutch 44 and the rear side clutch 32 is a disconnection mechanism for the connection/disconnection of the second power transmission path for transmitting a part of the power of the engine 12 transmitted to the front wheels 14 to the rear wheels 16 during 4WD (that is, disconnection mechanism that releases the second power transmission path during 2WD). As described above, the vehicle 10 is provided with the front side clutch 44 and the rear side clutch 32 as the disconnection mechanism. The first coupling 62 and the second coupling 64 are a first clutch and a second clutch that are disposed in the respective power transmission paths between the disconnection mechanism and the right and left rear wheels 16R, 16L. In addition, the front side clutch 44 is a third clutch for the connection/disconnection of the power transmission path between the front differential gear 20 and the propeller shaft 28 that is disposed on the engine 12 side of the propeller shaft 28. In addition, the rear side clutch 32 is a fourth clutch for the connection/disconnection of the power transmission path between the propeller shaft 28 and the rear wheels 16 that is disposed on the rear wheels 16 side of the propeller shaft 28.

In the vehicle 10 that has the configuration described above, the driving force corresponding to the transmission torque of the first coupling 62 and/or the second coupling 64 is transmitted to the rear wheels 16 as well if, for example, both the front side clutch 44 and the rear side clutch 32 are engaged and the transmission torque of the first coupling 62 and/or the second coupling 64 is controlled to be a value exceeding zero. Accordingly, the 4WD state where power is transmitted to both the front wheels 14 and the rear wheels 16 occurs. In the 4WD state, the transmission torque of the first coupling 62 and/or the second coupling 64 is controlled and the torque distribution for the front wheels 14 and the rear wheels 16 and the torque distribution for the right and left rear wheels 16R, 16L are adjusted as needed.

In the vehicle 10, the power transmission in the second power transmission path is cut off if, for example, one of the front side clutch 44 and the rear side clutch 32 is released. Accordingly, power is not transmitted to the rear wheels 16, and thus the 2WD state where power is transmitted only to the front wheels 14 occurs. If both the front side clutch 44 and the rear side clutch 32 are released, the connection between the power transmission member 68 and the right-left driving force distribution device 34 is cut off, and thus rotation is transmitted neither from the engine 12 side nor from the rear wheels 16 side to the respective rotating elements (second rotating member 42, driven pinion 26, propeller shaft 28, drive pinion 30, power transmission member 68, and the like) which constitute the power transmission path from the second rotating member 42 to the power transmission member 68 in the 2WD state. Accordingly, in the 2WD state, the respective rotating elements stop rotating, the respective rotating elements are prevented from rotating in conjunction, and traveling resistance is reduced. The front side clutch 44 and the rear side clutch 32 are disconnection mechanisms that stop the rotation of a predetermined rotating element which transmits power to the rear wheels 16 during 4WD by being released during 2WD. The predetermined rotating element is the rotating element that is interposed between the front side clutch 44 and the rear side clutch 32 among the rotating elements which constitute the power transmission path between the engine 12 and the rear wheels 16 (that is, the respective rotating elements that constitute the power transmission path from the second rotating member 42 to the power transmission member 68). A driving state where both the front side clutch 44 and the rear side clutch 32 are released and the rotation of each of the rotating elements described above is stopped (that is, the 2WD state where the rotation in conjunction is prevented) is a disconnection state where the rotation of the predetermined rotating element is stopped. The 2WD state in this disconnection state will be described as a 2WD_d state. Even in the 2WD state where the front side clutch 44 is released and the rear side clutch 32 is engaged, a state similar to the 2WD_d state can be produced if both the first coupling 62 and the second coupling 64 are released. In this state, however, it may be impossible to completely stop the rotation of the predetermined rotating element due to the drag of the multi-plate clutch in the first coupling 62 and/or the second coupling 64. Accordingly, the 2WD_d state is a state of aiming to stop the rotation of the predetermined rotating element in the 2WD state, and to stop the rotation of the predetermined rotating element includes a state where the rotation of the predetermined rotating element occurs to some extent in result.

In the vehicle 10, the connection between the input gear 61 and the rear wheels 16 is cut off and power is not transmitted to the rear wheels 16 if the front side clutch 44 and the rear side clutch 32 are engaged and the connection of the first coupling 62 and the second coupling 64 is cut off at the same time. Accordingly, it is possible to produce a state similar to the 2WD state where power is transmitted only to the front wheels 14. In this 2WD state, the respective rotating elements (second rotating member 42, driven pinion 26, propeller shaft 28, drive pinion 30, power transmission member 68, input gear 61, and the like) that constitute the power transmission path from the second rotating member 42 to the input gear 61 rotate in conjunction. Accordingly, fuel efficiency decreases, by the amount of the rotation in conjunction of the propeller shaft 28 and the like, despite the 2WD state. However, when the 2WD state is switched into the 4WD state, prompt switching is allowed just by connecting the first coupling 62 and/or second coupling 64. From another point of view, the 2WD state can be seen as a 4WD state where both the transmission torques of the first coupling 62 and the second coupling 64 become zero, which is a 4WD stand-by state as well.

According to the first embodiment described above, the 4WD state is a driving state where the disconnection mechanism described above is engaged by a clutch control unit 106 (described later), that is, a driving state where both the front side clutch 44 and the rear side clutch 32 are engaged regardless of the engagement or release of the first coupling 62 and the second coupling 64. According to the first embodiment described above, the 2WD state is a driving state where the disconnection mechanism described above is released by the clutch control unit 106 (described later), that is, a driving state where at least one of the front side clutch 44 and the rear side clutch 32 is released. In the case of the 2WD state, the 2WD_d state where both the front side clutch 44 and the rear side clutch 32 are released by the clutch control unit 106 (described later) occurs in most cases in view of fuel economy improvement. Accordingly, switching between the 2WD state and the 4WD state is usually switching between the 2WD_d state that is the disconnection state of the disconnection mechanism and the 4WD state that is the connection state of the disconnection mechanism. During the switching, transient switching is carried out to the 2WD state where only one of the front side clutch 44 and the rear side clutch 32 is released.

The vehicle 10 is provided with an electronic control unit (ECU) 100 that includes a control device for the vehicle 10 which switches the operation states of the front side clutch 44, the rear side clutch 32, the first coupling 62, and the second coupling 64 in accordance with, for example, the traveling state of the vehicle 10. The electronic control unit 100 is configured to include a so-called microcomputer that is provided with, for example, a CPU, a RAM, a ROM, an I/O interface, and the like. The CPU executes various types of control for the vehicle 10 by performing signal processing in accordance with a program stored in advance in the ROM while using a temporary storage function of the RAM. For example, the electronic control unit 100 executes output control for the engine 12, driving state switching control for the vehicle 10, and the like. The electronic control unit 100 is configured to be divided into those for engine control, driving state control, and the like as needed. As illustrated in FIG. 1, various actual values based on respective detection signals from various sensors are supplied to the electronic control unit 100. Examples of the various sensors include various rotation speed sensors 80, 82, 84, 86, 88, an accelerator opening sensor 90, a throttle valve opening sensor 92, a G sensor 94, a yaw rate sensor 96, a steering sensor 98, and the like. Examples of the various actual values based on the detection signals include an engine rotation speed Ne, the transmission input rotation speed Nin, the transmission output rotation speed Nout, a propeller shaft rotation speed Np, respective vehicle wheel speeds Nwfr, Nwfl, Nwrr, Nwrl corresponding to the rotation speeds (respective vehicle wheel speeds) Nw of the respective vehicle wheels (that is, front wheels 14R, 14L and rear wheels 16R, 16L), an accelerator opening θacc, a throttle valve opening θth, a longitudinal acceleration Gx of the vehicle 10, a lateral acceleration Gy of the vehicle 10, a yaw rate Ryaw that is a rotation angular velocity about a vertical axis of the vehicle 10, and a steering angle θsw and a steering direction of a steering wheel. As illustrated in FIG. 1, an engine output control command signal Se for the output control for the engine 12, an operation command signal Sd for switching the respective states of the front side clutch 44 and the rear side clutch 32, a torque command signal Sc for controlling the clutch torques of the first coupling 62 and the second coupling 64, and the like are respectively output from the electronic control unit 100 to engine control devices such as a fuel injection device, an ignition device, and a throttle actuator, the front side actuator 56 and the rear side actuator 76, respective actuators (electromagnetic solenoids) for driving the first coupling 62 and the second coupling 64, and the like. The electronic control unit 100 calculates the speed V of the vehicle 10 (hereinafter, referred to as a vehicle speed V) as one of various actual values based on the respective vehicle wheel speeds Nw. For example, the electronic control unit 100 may set the average vehicle wheel speed of the respective vehicle wheel speeds Nw as the vehicle speed V.

Figure 2:
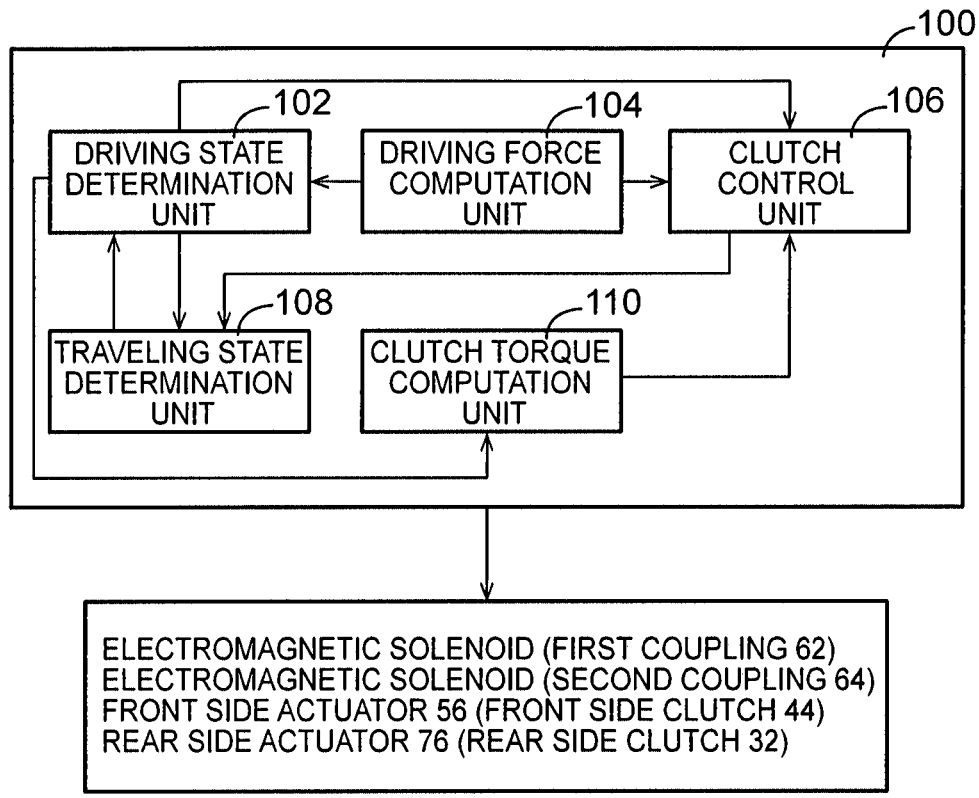
FIG. 2 is a functional block diagram showing a main part of a control function of an electronic control unit that is illustrated in FIG. 1.

FIG. 2 is a functional block diagram showing a main part of a control function of the electronic control unit 100. According to FIG. 2, the electronic control unit 100 is provided with driving state determination means, that is, a driving state determination unit 102, driving force computing means, that is, a driving force computation unit 104, and the clutch control unit 106.

The driving state determination unit 102 determines an optimal driving state of the vehicle 10 based on information such as the various signals described above. Specifically, in a case where it is determined that the vehicle 10 is in a steady traveling state where a driving force change in the vehicle 10 is smaller than a driving force change threshold which is obtained and stored in a prior experiment or design (that is, pre-defined) based on the accelerator opening θacc, the vehicle speed V, and the like, the driving state determination unit 102 determines the driving state of the vehicle 10 to be the 2WD_d state. In a case where it is determined that the driving force change exceeds the driving force change threshold, the driving state determination unit 102 determines the driving state of the vehicle 10 to be the 4WD state. In addition, the driving state determination unit 102 determines, based on the respective vehicle wheel speeds Nw, whether or not a predetermined vehicle wheel speed difference as a 4WD determination threshold which is pre-defined to determine whether it is desirable for the driving state of the vehicle 10 to be the 4WD state occurs between the respective vehicle wheels. In a case where it is determined that any one of rotation speed differences between the respective vehicle wheels exceeds the predetermined vehicle wheel speed difference, the driving state determination unit 102 determines the driving state of the vehicle 10 to be the 4WD state. In a case where it is determined based on the steering angle θsw that the vehicle 10 is being steered, the driving state determination unit 102 compares the actual yaw rate Ryaw to a target yaw rate Ryawtgt calculated based on the vehicle speed V, the steering angle θsw, and the like and determines whether or not any one of an understeer state and an oversteer state is occurring as a vehicle behavior. In a case where it is determined that any one of the understeer state and the oversteer state is occurring, the driving state determination unit 102 determines the driving state of the vehicle 10 to be the 4WD state. In addition, in a case where, for example, a known 2WD/4WD selection switch operated by a driver is provided in the vehicle 10, the driving state determination unit 102 determines whether the driving state of the vehicle 10 should be in the 2WD state or the 4WD state based on, for example, the operation state of the 2WD/4WD selection switch.

The driving force computation unit 104 calculates an optimal front-rear wheel driving force distribution based on information such as the various signals described above. Specifically, the driving force computation unit 104 calculates an estimated value (estimated engine torque) Tep for an engine torque Te based on the engine rotation speed Ne, the throttle valve opening θth, and the like from a pre-defined predetermined relationship (for example, engine torque map), and calculates the front-rear wheel driving force distribution to ensure the maximum acceleration performance. In a case where the driving state of the vehicle 10 is determined to be the 2WD_d state by the driving state determination unit 102, the driving force computation unit 104 turns the driving force distribution to the rear wheels 16 into zero. In addition, the driving force computation unit 104 reduces the driving force distribution to the rear wheels 16 in a case where it is determined that the driver's operation situation and the driving force change in the vehicle 10 are stable based on the throttle valve opening θth, the vehicle speed V, the respective vehicle wheel speeds Nw, and the like. Accordingly, a situation close to front wheel driving occurs and fuel economy is improved. In addition, the driving force computation unit 104 reduces the driving force distribution to the rear wheels 16 so as to prevent a tight braking phenomenon during low-speed turning.

The clutch control unit 106 outputs respective command signals to the front side actuator 56 that switches the connection/disconnection state of the front side clutch 44, the rear side actuator 76 that switches the connection/disconnection state of the rear side clutch 32, the electromagnetic solenoid (not illustrated) that controls the transmission torque of the first coupling 62, and the electromagnetic solenoid (not illustrated) that controls the transmission torque of the second coupling 64 for achieving the driving state determined by the driving state determination unit 102 and the front-rear wheel driving force distribution calculated by the driving force computation unit 104. Specifically, in a case where the driving state of the vehicle 10 is determined to be the 2WD_d state by the driving state determination unit 102, the clutch control unit 106 outputs commands for releasing the front side clutch 44 and the rear side clutch 32 and turning the transmission torques of the first coupling 62 and the second coupling 64 into zero to the front side actuator 56, the rear side actuator 76, and the respective electromagnetic solenoids, respectively. In a case where the driving state of the vehicle 10 is determined to be the 4WD state by the driving state determination unit 102, the clutch control unit 106 outputs commands for connecting (engaging) the front side clutch 44 and the rear side clutch 32 and controlling the transmission torques of the first coupling 62 and the second coupling 64 to the front side actuator 56, the rear side actuator 76, and the respective electromagnetic solenoids, respectively, for the 4WD state with the front-rear wheel driving force distribution calculated by the driving force computation unit 104.

During a transition from the 2WD_d state to the 4WD state, the clutch control unit 106 outputs a command for connecting the rear side clutch 32 to the rear side actuator 76 first. This is to connect the rear side clutch 32 to which no synchronization mechanism is attached in a state where the rotation of the power transmission member 68 and the input gear 61 is stopped, that is, in a state where the rotation speeds of the power transmission member 68 and the input gear 61 are substantially synchronized with each other. Then, the clutch control unit 106 outputs a command for connecting the front side clutch 44 to which the synchronization mechanism is attached to the front side actuator 56. Then, the clutch control unit 106 outputs commands for generating the transmission torques in the first coupling 62 and the second coupling 64 to the respective electromagnetic solenoids for achieving the front-rear wheel driving force distribution calculated by the driving force computation unit 104 in the 4WD state where the front side clutch 44 and the rear side clutch 32 are engaged. A series of the above-described control procedures performed during the transition from the 2WD_d state to the 4WD state is a normal 4WD transition control procedure.

In the vehicle 10 described above, the front side and rear side clutches 44, 32 and the first and second couplings 62, 64 are controlled by the clutch control unit 106 and the driving state is switched between the 2WD_d state and the 4WD state to become the driving state that is determined by the driving state determination unit 102. Switching to the 4WD state for traveling stability improvement during straight traveling of the vehicle 10 (that is, straight traveling stability) against disturbances such as a road surface disturbance (bumpy road and low μ road) and crosswind is also considerable. However, more-than-necessary switching to the 4WD state is likely to result in fuel economy deterioration. Also, if the 2WD state is maintained for a long period of time, it may be impossible to promptly improve the straight traveling stability of the vehicle 10.

The clutch control unit 106 executes 2WD clutch engagement control for engaging or half-engaging each of the first coupling 62 and the second coupling 64 based on the traveling state of the vehicle 10 while maintaining the 2WD state. For example, the clutch control unit 106 executes the 2WD clutch engagement control, while maintaining the 2WD state, by engaging or half-engaging the first coupling 62 and the second coupling 64 with an equal clutch torque at the same time. The traveling state of the vehicle 10 is a traveling state relating to the straight traveling stability of the vehicle 10. Accordingly, the clutch control unit 106 executes the 2WD clutch engagement control in a case where the traveling state relating to the straight traveling stability of the vehicle 10 has become a state subjected to a predetermined disturbance (that is, in a case where the vehicle 10 is in a state subjected to a predetermined disturbance relating to the straight traveling stability). The predetermined disturbance is, for example, a factor that affects the behavior of the vehicle 10 during the straight traveling such as the road surface disturbance such as the bumpy road and the low μ road and natural wind which the vehicle 10 is subjected to such as the crosswind. The state subjected to the predetermined disturbance is, for example, a state where a rotation difference occurs between the vehicle wheel speeds Nwrr, Nwrl of the right and left rear wheels 16R, 16L with respect to the predetermined disturbance and a pre-defined state where it is desirable to improve the straight traveling stability of the vehicle 10. Accordingly, the clutch control unit 106 executes the 2WD clutch engagement control so as to improve the straight traveling stability of the vehicle 10 with respect to the predetermined disturbance during the straight traveling of the vehicle 10.

In addition, the traveling state of the vehicle 10 is a traveling state associated with the driver's driving demand. Accordingly, the clutch control unit 106 executes the 2WD clutch engagement control in a case where the driving demand is within a predetermined range. The driving demand is, for example, a driver demand for the vehicle 10 that is calculated by the driving force computation unit 104 based on the accelerator opening θacc and the vehicle speed V. Not only a driving torque demand [Nm] for the front wheels 14 but also a driving force demand [N] for the front wheels 14, a driving power demand [W] for the front wheels 14, a target torque of the engine 12, or the like are used as the driving demand. Also, simply the accelerator opening θacc [%], the throttle valve opening θth [%], an intake air amount of the engine 12 [g/sec], and the like can be used as the driving demand described above. To be within the predetermined range described above means, for example, a traveling state entailing an area where the driving demand is lower with the transition to the 4WD state not clearly needed among the areas of the driving demand where the engine 12 is in a light-load state where the switching to the 4WD state is unlikely to be determined. In other words, to be within the predetermined range described above means a traveling state entailing the area where the driving demand is lower, not adjacent to the area where the driving demand is higher with the engine 12 being in a high-load state where the switching to the 4WD state is likely to be determined. This is because the fuel economy deterioration that results from the transition to the 4WD state is more likely to occur in, for example, the area where the driving demand is lower than in the area where the driving demand is higher and the area adjacent thereto.

Figure 3:
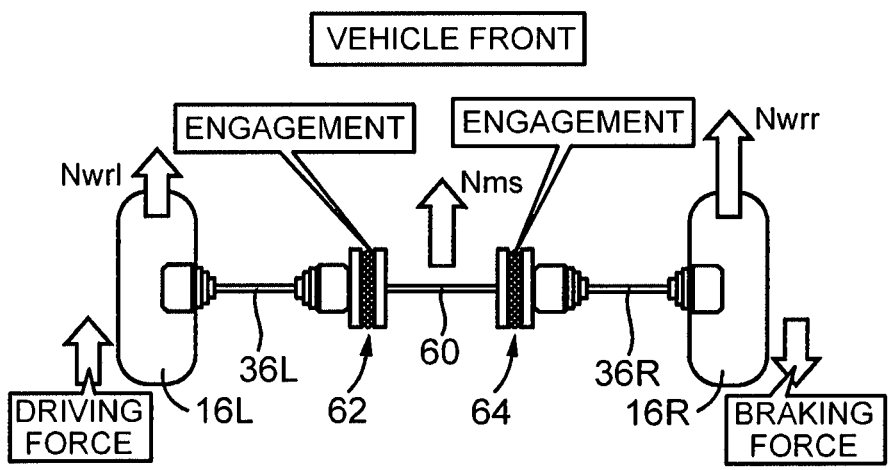
FIG. 3 is a diagram for showing the concept of two wheel drive clutch engagement control for the 4WD vehicle.

FIG. 3 is a diagram for showing the concept of the 2WD clutch engagement control. According to FIG. 3, the 2WD clutch engagement control is executed, by engaging the first and second couplings 62, 64 at the same time, when the disturbance or the like causes the rotation difference to occur between the vehicle wheel speeds Nwrr, Nwrl of the right and left rear wheels 16R, 16L. Then, the differential between the right and left rear wheels 16R, 16L is limited. During the execution of the 2WD clutch engagement control, the rotation speed Nms of the intermediate shaft 60 converges to ((Nwrr+Nwrl)/2), a braking force acts on the right rear wheel 16R to decrease the vehicle wheel speed Nwrr and a driving force acts on the left rear wheel 16L to increase the vehicle wheel speed Nwrl, and a stable moment acts on the vehicle 10. In other words, a moment that suppresses the rotation difference between the right and left rear wheels 16R, 16L acts on the vehicle 10. At the initiation of the 2WD clutch engagement control, the rotation speed Nms of the intermediate shaft 60 is approximately zero, and thus a braking force acts instantaneously on the right and left rear wheels 16R, 16L.

The electronic control unit 100 is also provided with traveling state determination means, that is, a traveling state determination unit 108, and clutch torque computing means, that is, a clutch torque computation unit 110 so as to realize the 2WD clutch engagement control.

The traveling state determination unit 108 determines whether or not the vehicle 10 is traveling straight. Specifically, the traveling state determination unit 108 determines whether or not the vehicle 10 is traveling straight, based on the steering angle θsw, the lateral acceleration Gy, and the yaw rate Ryaw, from the pre-defined arithmetic expressions represented by the following expressions (1) to (3). When all of the following expressions (1) to (3) are satisfied, the traveling state determination unit 108 determines that the vehicle 10 is traveling straight. θswth, Gyth, Ryawth in the following expressions (1) to (3) are straight traveling determination thresholds with respect to the steering angle θsw, the lateral acceleration Gy, and the yaw rate Ryaw, respectively. The straight traveling determination thresholds are, for example, pre-defined determination values for determining whether the vehicle 10 is traveling straight.

$$|\theta sw| \leq \theta swth \quad (1)$$

$$|Gy| \leq Gyth \quad (2)$$

$$|Ryaw| \leq Ryawth \quad (3)$$

The traveling state determination unit 108 determines whether the vehicle 10 is in the 2WD_d state (disconnection state) or in the 4WD state (connection state) based on the driving state determined by the driving state determination unit 102 or the respective command signals output by the clutch control unit 106.

In a case where it is determined that the vehicle 10 is traveling straight, the traveling state determination unit 108 determines whether or not the traveling state of the vehicle 10 has become a state subjected to a predetermined disturbance. Specifically, the traveling state determination unit 108 determines whether or not the traveling state of the vehicle 10 has become a state subjected to a predetermined disturbance, based on the respective vehicle wheel speeds Nwfr, Nwfl, Nwrr, Nwrl and the yaw rate Ryaw, from the pre-defined arithmetic expressions represented by the following expressions (4) to (6). When all of the following expressions (4) to (6) are satisfied, the traveling state determination unit 108 determines that the traveling state of the vehicle 10 has become a state subjected to a predetermined disturbance. In the following expressions (4) to (6), (-n) is each actual value that is acquired for each predetermined sampling period (refer to the cycle time in the flowchart in FIG. 4). In the following expression (6), the integrated value on the left-hand side is the integrated value of the yaw rate deviation between the actual value of the yaw rate Ryaw and the value (=0) of the yaw rate Ryaw in the ideal state during the straight driving. In the following expressions (4) to (6), the integrated value of each deviation on the left-hand side is reset to zero in a case where it is determined by the traveling state determination unit 108 that the vehicle 10 is not traveling straight, in a case where it is determined by the traveling state determination unit 108 that the traveling state of the vehicle 10 has become a state subjected to a predetermined disturbance, or in a case where the number of samples n reaches a specified number before the determination that the traveling state of the vehicle 10 has become a state subjected to a predetermined disturbance. In the following expressions (4) to (6), ΔNwth and ΔRyawth are disturbance determination thresholds for the integrated value of the rotation speed deviation between the right and left wheels and the integrated value of the yaw rate deviation, respectively. The disturbance determination thresholds are, for example, pre-defined determination values for determining whether the traveling state of the vehicle 10 has become a state subjected to a predetermined disturbance.

$$\Sigma|Nwfrn-Nwfln| \geq \Delta Nwth \quad (4)$$

$$\Sigma|Nwrrn-Nwrln| \geq \Delta Nwth \quad (5)$$

$$\Sigma|Ryawn| \geq \Delta Ryawth \quad (6)$$

In a case where it is determined by the traveling state determination unit 108 that the traveling state of the vehicle 10 has become a state subjected to a predetermined disturbance, the driving force computation unit 104 calculates the estimated value (estimated driving force) Fp of the current driving force F in the 2WD_d state, based on the estimated engine torque Tep, a torque ratio (=turbine torque/pump torque) t of a torque converter (not illustrated) disposed between the engine 12 and the transmission 18, the current gear ratio γ of the transmission 18, and the like, from the pre-defined arithmetic expression represented by, for example, the following expression (7). In the following expression (7), i is the reduction ratio of the front differential gear 20 or the like in the power transmission path further on the front wheels 14 side than on the output gear 18a of the transmission 18 and rw is the tire effective radius of the front wheels 14. The torque ratio t described above is a function of a speed ratio e of the torque converter (=turbine rotation speed (transmission input rotation speed Nin)/pump rotation speed (engine rotation speed Ne)). The driving force computation unit 104 calculates the torque ratio t based on the actual speed ratio e from, for example, a pre-defined relationship (map) between the speed ratio e and the torque ratio t.

$$Fp = Tep \times t \times \gamma \times i / rw \quad (7)$$

In a case where it is determined by the traveling state determination unit 108 that the traveling state of the vehicle 10 has become a state subjected to a predetermined disturbance, the driving state determination unit 102 determines whether or not to carry out the transition to the connection state (4WD state) (that is, determines whether or not the driving demand is within a predetermined range), based on the estimated driving force Fp calculated by the driving force computation unit 104 and traveling resistance RL, from the pre-defined arithmetic expression represented by, for example, the following expression (8). When the following expression (8) is satisfied, the driving state determination unit 102 determines the driving state of the vehicle 10 to be the connection state (4WD state). When the following expression (8) is not satisfied, the driving state determination unit 102 determines the driving state of the vehicle 10 to be maintained in the disconnection state (2WD_d state). In the following expression (8), the value of (Fp−RL) is a surplus driving force and Fpth is a 4WD transition determination threshold for the surplus driving force. The 4WD transition determination threshold is a pre-defined determination value for determining the transition to the 4WD state by using the surplus driving force that, for example, decreases when the engine 12 is in the light-load state and increases when the engine 12 is in the high-load state. In the case of, for example, steady traveling on a flat road, the traveling resistance RL described above is the sum of air resistance Fa and rolling resistance Fr (=Fa+Fr) [N]. The driving state determination unit 102 calculates the traveling resistance RL based on the vehicle speed V and an estimated weight Wg from, for example, a pre-defined relational expression (RL=Fa+Fr:Fa=(½)×ρ×A×Cd×V²; ρ being air density, A being front projection area, and Cd being an air resistance coefficient, Fr=μ×Wg; μ being a rolling resistance coefficient and Wg being the vehicle weight (for example, estimated weight)). Alternatively, the driving state determination unit 102 may calculate the traveling resistance RL based on the vehicle speed V and the estimated weight Wg from, for example, a pre-defined relationship (map). Alternatively, the driving state determination unit 102 may calculate the traveling resistance RL based on the vehicle speed V from, for example, a pre-defined relationship (map) between the vehicle speed V and the traveling resistance RL because the traveling resistance RL depends solely on the vehicle speed V when the estimated weight Wg is deemed to be substantially constant. In addition, in the case of traveling on, for example, a slope road, the driving state determination unit 102 calculates the traveling resistance RL (=Fr+Fa+Fs) by adding grade resistance Fs. The driving state determination unit 102 calculates the grade resistance Fs based on a road surface gradient Or from, for example, a pre-defined relational expression (Fs=Wg×sin θr: θr being the road surface gradient).

$$Fp-RL \geq Fpth \quad (8)$$

In a case where it is determined by the driving state determination unit 102 that the transition to the connection state (4WD state) is not to be carried out (that is, in a case where the driving demand is within a predetermined range), the clutch torque computation unit 110 calculates clutch torques Tc of the first coupling 62 and the second coupling 64 at a time when the 2WD clutch engagement control is executed by the clutch control unit 106 (that is, when the differential limitation between the right and left rear wheels 16R, 16L is executed). Specifically, the clutch torque computation unit 110 calculates the clutch torques Tc based on the respective vehicle wheel speeds Nwrr, Nwrl of the rear wheels 16 from the pre-defined arithmetic expressions represented by the following expressions (9) to (11). In the following expressions (9) and (10), Nwt is the target rotation speed at a time when the differential between the right and left rear wheels 16R, 16L is limited and is defined as the average value of the respective vehicle wheel speeds Nwrr, Nwrl of the rear wheels 16. In the following expression (10), (*) is (1 or r), (–(n)) is a value that is acquired for each predetermined sampling period, (–(n–i)) is a value that is acquired i sample times ahead skipping with respect to the moment of the acquisition of the (–(n)), and Δt is a computation cycle. dω*/dt (that is, dωl/dt and dωr/dt) represents the rate of change in the value by which the respective actual values deviate from the target rotation speed (that is, the rate at which the actual value deviates from the target rotation speed). In the following expression (11), J is the inertia of the rear wheels 16 and max(dωl/dtdωr/dt) is the larger value between dωl/dt and dωr/dt.

$$Nwt=(Nwrr+Nwrl)/2 \quad (9)$$

$$d\omega^*/dt=|(Nwt(n)-Nwr^*(n))-(Nwt(n-i)-Nwr^*(n-i))|/(i\times\Delta t) \quad (10)$$

$$Tc=J\times\max(d\omega l/dtd\omega r/dt) \quad (11)$$

In a case where it is determined by the driving state determination unit 102 that a transition to the connection state (4WD state) is not to be carried out, the clutch control unit 106 outputs, to the respective electromagnetic solenoids, commands for engaging both the first coupling 62 and the second coupling 64 at the clutch torques Tc calculated by the clutch torque computation unit 110 while maintaining the 2WD_d state. In a case where it is determined by the driving state determination unit 102 that the transition to the connection state (4WD state) is to be carried out, the clutch control unit 106 outputs commands for engaging the front side clutch 44 and the rear side clutch 32 to the front side actuator 56 and the rear side actuator 76, respectively.

The input gear 61 rotates if the first coupling 62 and the second coupling 64 are engaged in the 2WD_d state. Then, a state occurs where the rotation speed is not synchronized with the rotation speed of the power transmission member 68 in a state where the rotation is stopped. Accordingly, a transition from this state to the 4WD state is impossible in the normal 4WD transition control procedure described above in which the rear side clutch 32 is connected first. In a case where a transition is carried out to the 4WD state from a state where the 2WD clutch engagement control is executed in the 2WD_d state, the clutch control unit 106 outputs, to the front side actuator 56, a command for engaging the front side clutch 44, to which the synchronization mechanism is attached, first. Then, a state occurs where the rotation speed of the power transmission member 68 and the rotation speed of the input gear 61 are substantially synchronized with each other, and thus the rear side clutch 32 can be engaged and a transition to the 4WD state can be carried out.

Figure 4:
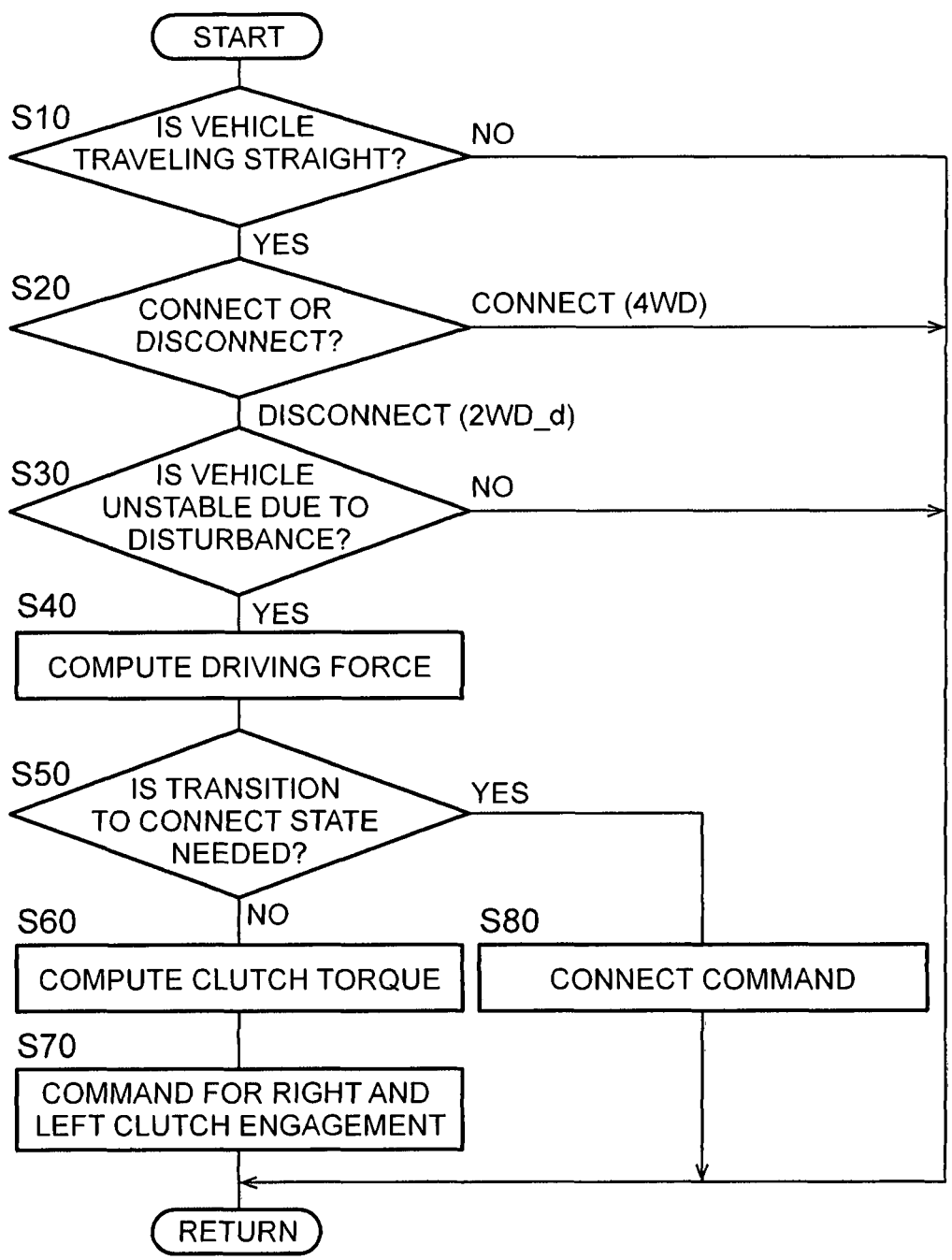
FIG. 4 is a flowchart showing a main part of a control operation by the electronic control unit, that is, a control operation for improving fuel economy and straight traveling stability at the same time.
Figure 5:
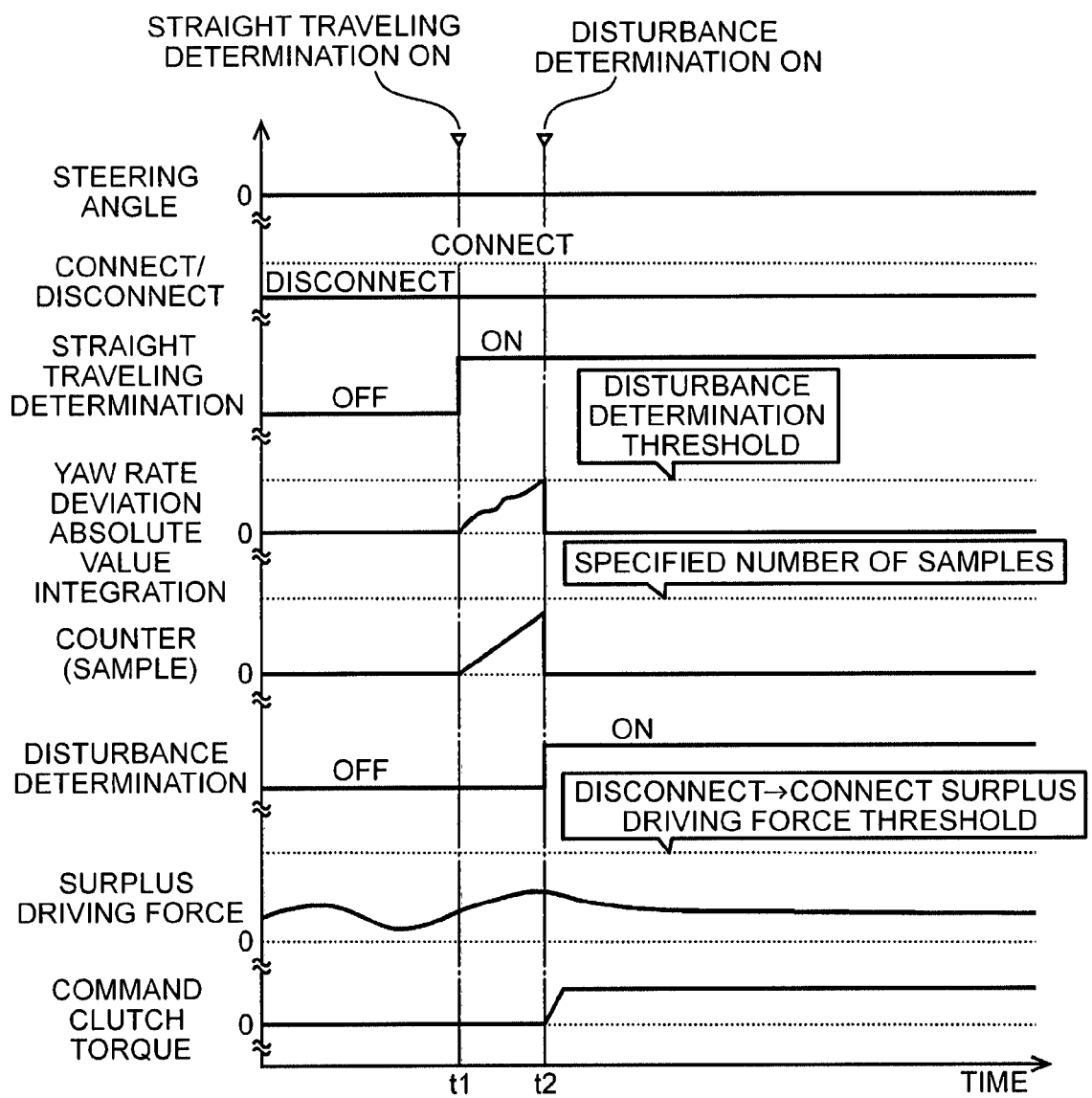
FIG. 5 is an example of a time chart for a case where the control operation that is illustrated in the flowchart in FIG. 4 is executed.

FIG. 4 is a flowchart showing a main part of a control operation by the electronic control unit 100, that is, a control operation for improving fuel economy and straight traveling stability at the same time, which is repeatedly executed in an extremely short cycle time of, for example, approximately several msec to dozens of msec. FIG. 5 is an example of a time chart for a case where the control operation that is illustrated in the flowchart in FIG. 4 is executed. FIG. 5 is an example of a case where a disturbance occurs during the straight traveling.

According to FIG. 4, it is determined first, for example, whether or not the vehicle 10 is traveling straight in Step (hereinafter, Step will be omitted) S10 corresponding to the traveling state determination unit 108. In the case of a negative determination in S10, this routine is terminated. In the case of a positive determination in S10 (refer to t1 moment in FIG. 5), it is determined, for example, whether the vehicle 10 is in the disconnection state (2WD_d state) or the connection state (4WD state) in S20 corresponding to the traveling state determination unit 108. This routine is terminated in a case where it is determined in S20 that the vehicle 10 is in the connection state (4WD state). In a case where it is determined in S20 that the vehicle 10 is in the disconnection state (2WD_d state), it is determined, for example, whether or not the traveling state of the vehicle 10 has become a state subjected to a predetermined disturbance in S30 corresponding to the traveling state determination unit 108 (refer to beyond t1 moment in FIG. 5). This routine is terminated in the case of a negative determination in S30. In the case of a positive determination in S30, the current estimated driving force Fp in, for example, the 2WD_d state is calculated in S40 corresponding to the driving force computation unit 104. Then, in S50 corresponding to the driving state determination unit 102, it is determined whether or not a transition to the connection state (4WD state) has to be carried out based on, for example, the estimated driving force Fp calculated in S40 and the traveling resistance RL. In the case of a negative determination in S50, the clutch torques Tc of the first coupling 62 and the second coupling 64 at a time when the 2WD clutch engagement control is executed are calculated in S60 corresponding to the clutch torque computation unit 110 by using the arithmetic expression represented by, for example, the expression (11) described above. Then, in S70 corresponding to the clutch control unit 106, both the first coupling 62 and the second coupling 64 are engaged (refer to beyond t2 moment in FIG. 5) at the clutch torques Tc calculated in S60 while, for example, the 2WD_d state is maintained. In the case of a positive determination in S50, the front side clutch 44 and the rear side clutch 32 are engaged in accordance with, for example, the normal 4WD transition control procedure in S80 corresponding to the clutch control unit 106 and the transition from the 2WD_d state to the 4WD state is carried out.

In FIG. 5, a disturbance determination is performed when a straight driving determination becomes ON at t1 moment. In FIG. 5, the integrated value of yaw rate deviation absolute values is illustrated as an integrated value used in the disturbance determination. However, the integrated value of rotation speed deviation absolute values for the respective right and left wheels of the front and rear wheels is also used as an integrated value used in the disturbance determination. If both of the integrated values become equal to or greater than a disturbance determination threshold until the number of samples reaches the specified number of samples, the disturbance determination becomes ON as illustrated by t2 moment. In this case, the surplus driving force is exceeded by a surplus driving force threshold (4WD transition determination threshold), and thus a command clutch torque for engaging both the first coupling 62 and the second coupling 64 is output thereafter with the disconnection state (2WD_d state) being maintained.

According to the first embodiment described above, the first coupling 62 and the second coupling 64 are friction clutches, and thus the first coupling 62 and the second coupling 64 can be engaged or half-engaged with the 2WD_d state being maintained. In addition, a differential limitation can be applied to both of the right and left rear wheels 16, with the 2WD_d state being maintained, by executing the 2WD clutch engagement control for engaging or half-engaging the first coupling 62 and the second coupling 64. When the 2WD clutch engagement control is executed, a moment that suppresses a rotation speed difference acts, even while the 2WD_d state is maintained, on the right and left rear wheels 16 where the rotation speed difference occurs. In other words, if the 2WD clutch engagement control is executed with the rotation speed difference occurring between the right and left rear wheels 16, the braking force acts on the vehicle wheel on the high rotation side and the driving force acts on the vehicle wheel on the low rotation side so that the stable moment acts on the vehicle 10 without the transition to the 4WD state. Accordingly, both fuel economy and straight traveling stability can be improved at the same time.

According to the first embodiment, the traveling state of the vehicle 10 is a traveling state relating to the straight traveling stability of the vehicle 10 and the clutch control unit 106 executes the 2WD clutch engagement control in a case where the traveling state relating to the straight traveling stability of the vehicle 10 has become a state subjected to a predetermined disturbance. Accordingly, the differential limitation can be applied to both of the right and left rear wheels 16, with the 2WD_d state being maintained, when the traveling state has become a state subjected to a predetermined disturbance, and thus the straight traveling stability can be improved without carrying out the transition to the 4WD state.

According to the first embodiment, the clutch control unit 106 executes the 2WD clutch engagement control in a case where the driving demand is within a predetermined range. Accordingly, in a case where the driving demand in which a transition to the 4WD state is not clearly needed is within a predetermined range, the differential limitation can be applied to both of the right and left rear wheels 16 with the 2WD_d state being maintained. Accordingly, a stable moment can act on the vehicle 10 with the fuel economy deterioration that is attributable to a transition to the 4WD state being suppressed.

According to the first embodiment, the clutch control unit 106 executes the 2WD clutch engagement control by engaging or half-engaging the first coupling 62 and the second coupling 64 at the same time with the 2WD_d state being maintained, and thus an appropriate differential limitation can be applied to both of the right and left rear wheels 16 by the execution of the 2WD clutch engagement control.

According to the first embodiment, the clutch control unit 106 executes the 2WD clutch engagement control, with the 2WD_d state being maintained, by respectively engaging or half-engaging the first coupling 62 and the second coupling 64 at the clutch torques Tc calculated based on the respective vehicle wheel speeds Nwrr, Nwrl of the rear wheels 16. Accordingly, an appropriate differential limitation can be applied to both of the right and left rear wheels 16 by the execution of the 2WD clutch engagement control.

According to the first embodiment, the 2WD state is realized as at least one of the front side clutch 44 and the rear side clutch 32 is released by the clutch control unit 106. Particularly, in the 2WD_d state where both the front side clutch 44 and the rear side clutch 32 are released, the rotation of the rotating members (for example, the propeller shaft 28) between the front side clutch 44 and the rear side clutch 32 can be substantially stopped, and fuel economy can be further improved.

According to the first embodiment, the clutch control unit 106 engages the front side clutch 44, to which the synchronization mechanism is attached, first in a case where a transition is carried out to the 4WD state from the state where the 2WD clutch engagement control is executed in the 2WD_d state. Accordingly, the rotation speeds of the relative rotation members of the rear side clutch 32 can be substantially synchronized with each other and the rear side clutch 32 can be engaged. Accordingly, a transition to the 4WD state can be appropriately executed during the 2WD clutch engagement control.

Next, a second embodiment of the invention will be described. In the following description, like reference numerals will be used to refer to the parts common to the embodiments and description thereof will be omitted.

In the first embodiment described above, the clutch control unit 106 executes the 2WD clutch engagement control by engaging or half-engaging the first coupling 62 and the second coupling 64 at the same time and at an equal clutch torque with the 2WD state being maintained. Instead of this manner in the first embodiment described above, the clutch control unit 106 according to the second embodiment executes the 2WD clutch engagement control by respectively engaging or half-engaging the first coupling 62 and the second coupling 64, with the 2WD state being maintained, based on the deviation between the average rotation speed of the right and left rear wheels 16 and the respective vehicle wheel speeds Nwrr, Nwrl. Even in this case, the differential between the right and left rear wheels 16R, 16L is limited as in the first embodiment described above. In this case, the clutch control unit 106 executes the 2WD clutch engagement control by engaging or half-engaging the clutch disposed on the rear wheel 16 side with a higher rotation speed first between the first coupling 62 and the second coupling 64. This is to further improve the stability by applying an anti-moment, caused when the braking force acts, to the rear wheel 16 on the higher rotation speed side first.

Specifically, the clutch torque computation unit 110 calculates the clutch torque Tcl of the first coupling 62 and the clutch torque Tcr of the second coupling 64, based on the respective vehicle wheel speeds Nwrr, Nwrl of the rear wheels 16, from the pre-defined arithmetic expressions represented by the following expressions (12) to (14) instead of those according to the first embodiment described above. In the following expressions (12) and (13), Nwt is the target rotation speed at a time when the differential between the right and left rear wheels 16R, 16L is limited and is defined as the average value of the respective vehicle wheel speeds Nwrr, Nwrl of the rear wheels 16. In the following expressions (13) and (14), (*) is (1 or r) and ΔNw* is the deviation between the target rotation speed Nwt and the respective vehicle wheel speeds Nwrr, Nwrl of the rear wheels 16. The following expression (14) is a pre-defined feedback control expression that is used to calculate a clutch torque Tc* (that is, Tcr and Tcl) which is a feedback control amount allowing the respective vehicle wheel speeds Nwrr, Nwrl of the rear wheels 16 to follow the target rotation speed Nwt. In this expression (14), dΔNw*/dt is a deviation differential value, ∫ΔNw*dt is a deviation integral value, Kp is a predetermined proportionality coefficient (proportional gain), Kd is a predetermined differential coefficient (differential gain), and Ki is a predetermined integral coefficient (integral gain).

$$Nwt=(Nwrr+Nwrl)/2 \quad (12)$$

$$\Delta Nw^*=Nwt-Nwr^* \quad (13)$$

$$Tc^*=Kp\times|\Delta Nw^*|+Kd\times|d\Delta Nw^*/dt|+Ki\times|\int\Delta Nw^*dt| \quad (14)$$

In a case where it is determined by the driving state determination unit 102 that a transition to the connection state (4WD state) is not to be carried out, the clutch control unit 106 outputs, to the respective electromagnetic solenoids, commands for engaging the first coupling 62 and the second coupling 64 at the respective clutch torques Tcr, Tcl calculated by the clutch torque computation unit 110 while maintaining the 2WD_d state. In this case, the clutch control unit 106 performs the command for the first clutch torque Tc* after the traveling state determination unit 108 determines that the traveling state of the vehicle 10 has become a state subjected to a predetermined disturbance on the coupling on the rear wheel 16 side where the deviation ΔNw* has a negative value (that is, where the vehicle wheel speed Nwr* exceeds the target rotation speed Nwt). Then, the clutch control unit 106 performs the command for the clutch torque Tc* also on the coupling on the rear wheels 16 side where the deviation ΔNw* has a positive value after the elapse of a predetermined delay time. The predetermined delay time is, for example, a pre-defined period of time for appropriately applying an anti-moment by the braking force to the rear wheel 16 where the vehicle wheel speed Nwr* exceeds the target rotation speed Nwt (* being 1 or r above).

Figure 6:
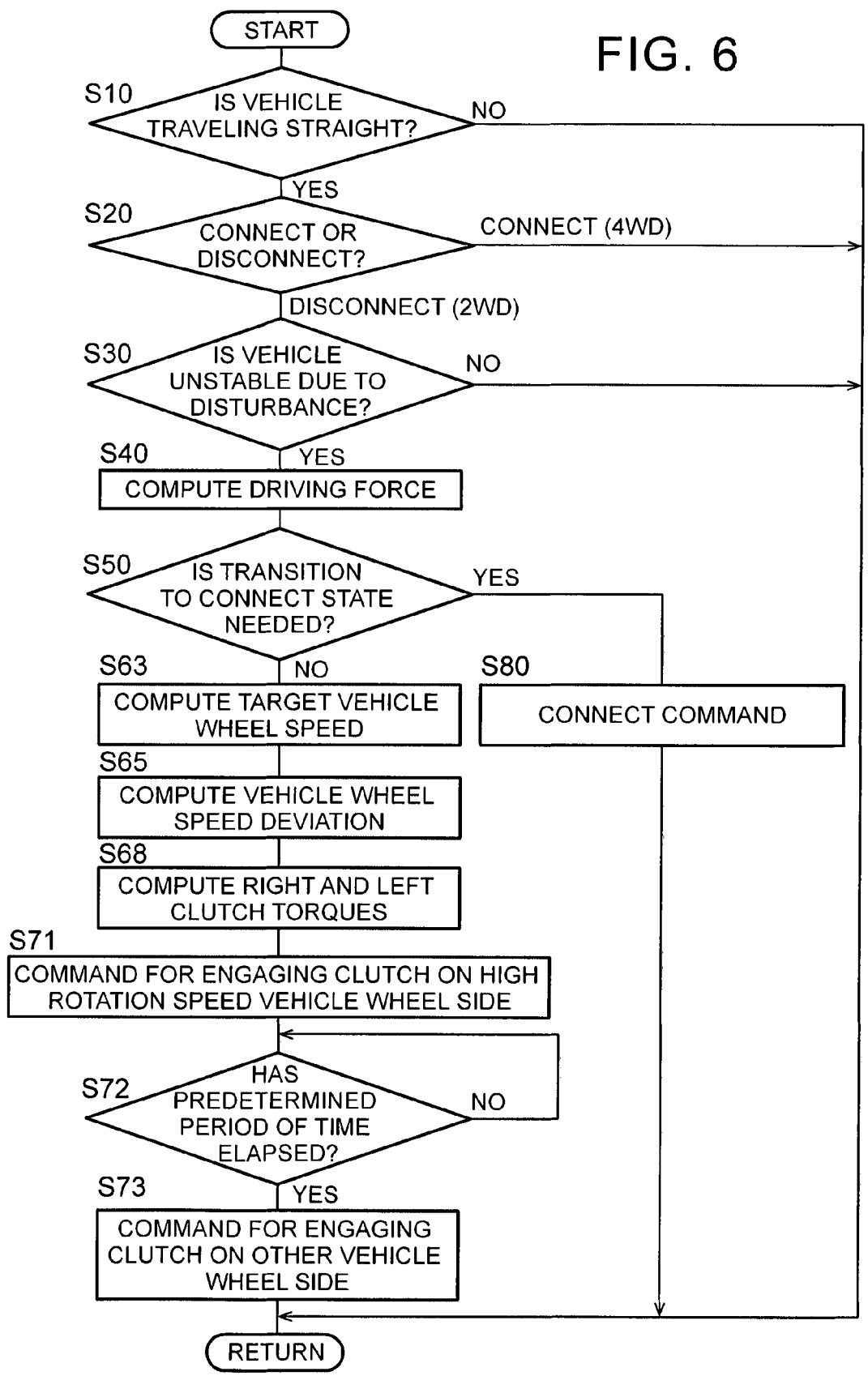
FIG. 6 is a flowchart showing a main part of a control operation by the electronic control unit, that is, a control operation for improving fuel economy and straight traveling stability at the same time, and is a flowchart showing a control operation according to a first embodiment that differs from what is illustrated in FIG. 4.
Figure 7:
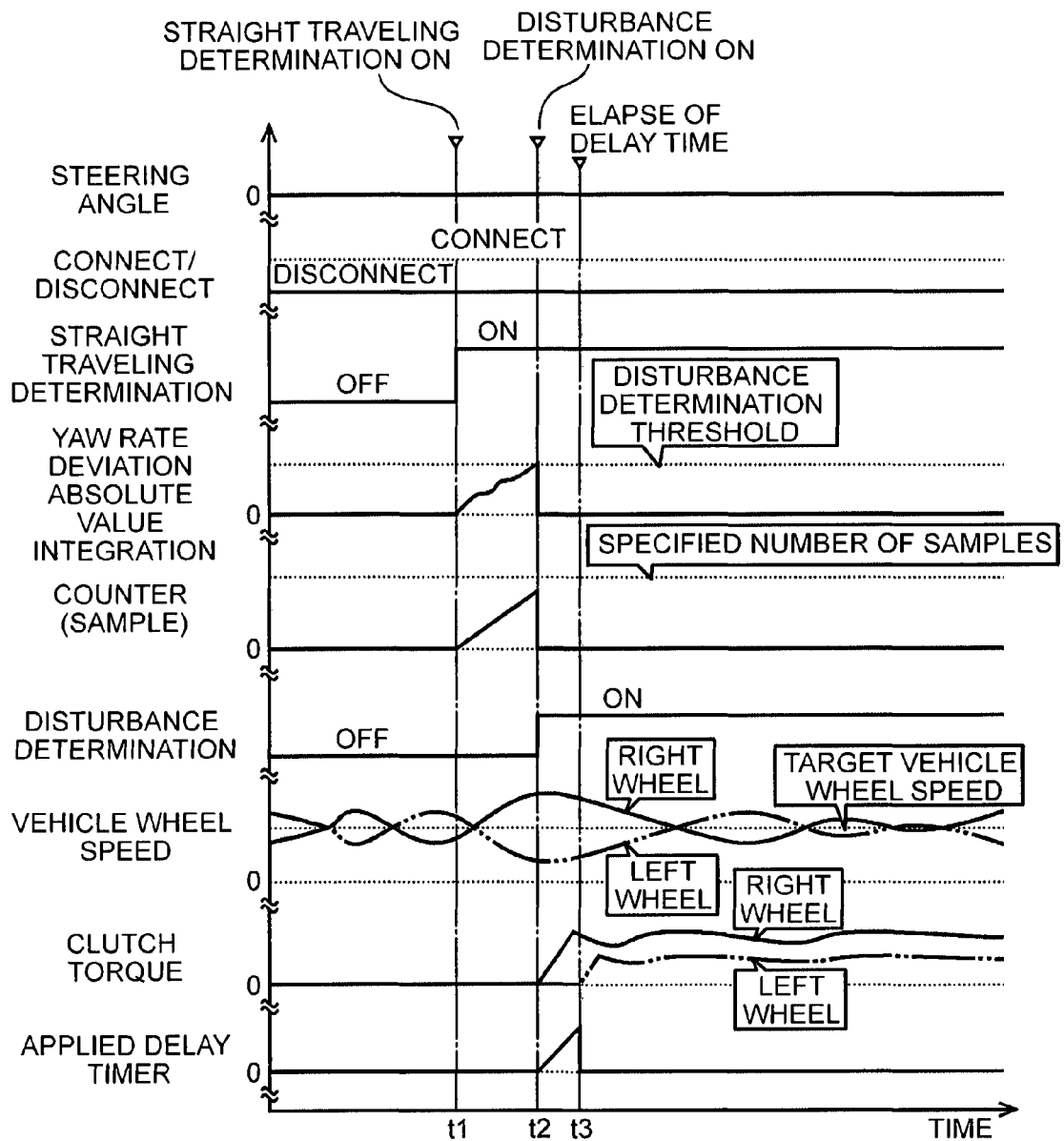
FIG. 7 is an example of a time chart for a case where the control operation that is illustrated in the flowchart in FIG. 6 according to a second embodiment is executed.

FIG. 6 is a flowchart showing a main part of a control operation by the electronic control unit 100, that is, a control operation for improving fuel economy and straight traveling stability at the same time, which is repeatedly executed in an extremely short cycle time of, for example, approximately several msec to dozens of msec. FIG. 7 is an example of a time chart for a case where the control operation that is illustrated in the flowchart in FIG. 6 is executed and is a flowchart illustrating a case where a disturbance occurs during the straight traveling. The flowchart in FIG. 6 differs from the flowchart in FIG. 4 mainly in that S60 is replaced with S63, S65, and S68. In the following description of FIG. 6, the parts different from FIG. 4 will be mainly described.

According to FIG. 6, the target rotation speed Nwt at a time when, for example, the 2WD clutch engagement control is executed is calculated in S63 corresponding to the clutch torque computation unit 110 in the case of a negative determination in S50. Then, in S65 corresponding to the clutch torque computation unit 110, for example, the deviations ΔNwr, ΔNwl between the target rotation speed Nwt and the respective vehicle wheel speeds Nwrr, Nwrl of the rear wheels 16 are calculated. Then, in S68 corresponding to the clutch torque computation unit 110, the clutch torque Tcl of the first coupling 62 and the clutch torque Tcr of the second coupling 64 at a time when the 2WD clutch engagement control is executed are calculated by using, for example, the feedback control expression illustrated by the expression (14) described above. Then, in S71, S72, and S73 corresponding to the clutch control unit 106, the first coupling 62 and the second coupling 64 are engaged at the respective clutch torques Tcr, Tcl calculated in S68 with, for example, the 2WD_d state being maintained. In other words, in S71, the coupling on the rear wheel 16 side where, for example, the vehicle wheel speed Nwrr or Nwrl is higher is engaged first (refer to beyond t2 moment in FIG. 7). Then, in S72, it is determined, for example, whether or not the predetermined delay time has elapsed. S72 is repeatedly executed in the case of a negative determination in S72. In the case of a positive determination in S72, the coupling on the opposite side is, for example, also engaged in S73 (refer to beyond t3 moment in FIG. 7).

In FIG. 7, a disturbance determination is performed when a straight driving determination becomes ON at t1 moment. In FIG. 7, the integrated value of yaw rate deviation absolute values is illustrated as an integrated value used in the disturbance determination. However, the integrated value of rotation speed deviation absolute values for the respective right and left wheels of the front and rear wheels is also used as an integrated value used in the disturbance determination. If both of the integrated values become equal to or greater than the disturbance determination threshold until the number of samples reaches the specified number of samples, the disturbance determination becomes ON as illustrated by t2 moment. Then, a command clutch torque for engaging the first coupling 62 and the second coupling 64 is output with the disconnection state (2WD_d state) being maintained. In this case, the command value for the clutch torque Tcr is output first for the second coupling 64 on the right rear wheel 16R side where the vehicle wheel speed Nwrr is higher (refer to beyond t2 moment), and the command value for the clutch torque Tcl is output for the first coupling 62 on the left rear wheel 16L side after the elapse of a predetermined delay time (refer to beyond t3 moment).

In the second embodiment described above, effects similar to those of the first embodiment are achieved. The clutch control unit 106 executes the 2WD clutch engagement control by respectively engaging or half-engaging the first coupling 62 and the second coupling 64 based on the deviations ΔNwr, ΔNwl between the average rotation speeds of both of the right and left rear wheels 16 (target rotation speed Nwt) and the respective vehicle wheel speeds Nwrr, Nwrl with the 2WD_d state being maintained, and thus an appropriate differential limitation can be applied to both of the right and left rear wheels 16 by the execution of the 2WD clutch engagement control.

According to the second embodiment described above, the clutch control unit 106 executes the 2WD clutch engagement control by engaging or half-engaging one of the first coupling 62 and the second coupling 64 on the rear wheel 16 side where the vehicle wheel speed Nwrr or Nwrl is higher first. Accordingly, the braking force acts on the rear wheel 16 on the high rotation side first and then the driving force acts on the rear wheel 16 on the low rotation side by the execution of the 2WD clutch engagement control. Accordingly, a stable moment acts appropriately on the vehicle 10.

The first and second embodiments of the invention have been described in detail above with reference to the accompanying drawings. However, the invention can also be applied to other, partially-changed aspects.

For example, engaging (or half-engaging) the first coupling 62 and the second coupling 64 at the same time during the 2WD clutch engagement control according to the first embodiment means at least initiating the engagement of the first coupling 62 and the second coupling 64 at the same time. The engagement does not have to be completed at the same time. The same time is a period that has a certain width with respect to a certain moment when the effect of the execution of the 2WD clutch engagement control is achieved, and thus can be considered as the substantially same period (substantially same moment).

In the calculation of the clutch torque Tc based on the respective vehicle wheel speeds Nwrr, Nwrl according to the embodiments described above, the clutch torque Tc is calculated based on the deviation between the respective vehicle wheel speeds Nwrr, Nwrl and the target rotation speed Nwt (average value of the respective vehicle wheel speeds Nwrr, Nwrl). However, the invention is not limited thereto. For example, the clutch torque Tc may be calculated based on the deviation between the right and left vehicle wheel speeds Nwrr, Nwrl.

In the embodiments described above, the electronically-controlled couplings (first coupling 62 and second coupling 64), which are a type of friction clutches, have been described as examples of the first clutch and the second clutch. However, the invention is not limited thereto. For example, the first clutch and the second clutch may be any clutches that can be engaged or half-engaged even in a state where the rotation speeds of the relative rotation members are not substantially synchronized with each other. The first clutch and the second clutch may also be known dog clutches to which synchronization mechanisms are attached or known hydraulic friction engagement devices.

In the embodiments described above, a dog clutch to which a synchronization mechanism is attached has been described as the front side clutch 44 that is the third clutch and a dog clutch has been described as the rear side clutch 32 that is the fourth clutch. However, the invention is not limited thereto. For example, the front side clutch 44 may be any clutch that can be engaged or half-engaged even in a state where the rotation speeds of the relative rotation members are not substantially synchronized with each other and may be a friction clutch or the like. In a case where a transition to the 4WD state from the state where the 2WD clutch engagement control is executed in the 2WD_d state is taken into account and at least one of the front side clutch 44 and the rear side clutch 32 is a dog clutch or a friction clutch to which a synchronization mechanism is attached that can be engaged or half-engaged even in a state where the rotation speeds of the relative rotation members are not substantially synchronized with each other, the transition to the 4WD state can be appropriately executed by engaging the clutch first. Accordingly, the front side clutch 44 may be a dog clutch and the rear side clutch 32 may be a dog clutch or a friction clutch to which a synchronization mechanism is attached. The dog clutch is not limited in type to an electromagnetic dog clutch. The dog clutch may be a dog clutch provided with, for example, a shift fork which axially moves a sleeve and is driven by an electrically-controllable or hydraulically-controllable actuator.

Also considerable is a case where both of the front side clutch 44 and the rear side clutch 32 are dog clutches to which no synchronization mechanism is attached. In this case, it is difficult to engage both and each of the front side clutch 44 and the rear side clutch 32 in a state where the 2WD clutch engagement control is executed in the 2WD_d state. The clutch control unit 106 engages the rear side clutch 32 prior to the initiation of the 2WD clutch engagement control in a case where the 2WD clutch engagement control is executed in the 2WD_d state. In this case, the rotation speeds of the relative rotation members of the rear side clutch 32 are substantially zero without exception in the 2WD_d state where the 2WD clutch engagement control has yet to be executed, and the rear side clutch 32 can be engaged in a state where the rotation speeds of the relative rotation members are substantially synchronized with each other. During the execution of the 2WD clutch engagement control, the rotation speeds of the relative rotation members of the front side clutch 44 are substantially synchronized with each other, and thus the engagement of the front side clutch 44 and the transition to the 4WD state can be carried out during the 2WD clutch engagement control. The front side clutch 44 can be engaged, even if the front side clutch 44 is a dog clutch, when, for example, the vehicle is stopped or the transmission 18 is in a neutral state. Accordingly, in a case where the front side clutch 44 is already engaged, the rotation speeds of the relative rotation members of the rear side clutch 32 are substantially synchronized with each other by the execution of the 2WD clutch engagement control, and thus the engagement of the rear side clutch 32 and the transition to the 4WD state can be carried out during the 2WD clutch engagement control. As described above, the transition to the 4WD state can be carried out after executing the 2WD clutch engagement control in the 2WD state where only one of the front side clutch 44 and the rear side clutch 32 is engaged.

The invention has been described with regard to switching between the 2WD_d state and the 4WD state in the embodiments described above. However, the invention can also be applied to switching between the 2WD state and the 4WD state. In a vehicle provided with only one of the front side clutch 44 and the rear side clutch 32, a state identical to the 2WD state where only one of the front side clutch 44 and the rear side clutch 32 is already engaged can be realized. Accordingly, the disconnection mechanism may be a disconnection mechanism that has only one of the front side clutch 44 and the rear side clutch 32. For example, in the vehicle 10 not provided with the rear side clutch 32, it may be impossible to completely stop the rotation of the predetermined rotating element, even in a state where the first coupling 62 and the second coupling 64 are released in the 2WD state, as the drag occurs in the wet multi-plate clutch constituting the coupling. Accordingly, it is effective to provide the rear side clutch 32 because the rotation attributable to the drag or the like can be prevented.

In the embodiments described above, the differential between the right and left rear wheels 16R, 16L is limited by engaging the first clutch and the second clutch. However, the invention is not limited thereto. For example, even a half-engagement for the first clutch and the second clutch can limit the differential between the right and left rear wheels 16R, 16L to some extent. Certain effects of the invention can be achieved even in this case.

In the embodiments described above, the vehicle 10 has a structure in which power is transmitted to the front wheels 14 all the time and the rear wheels 16 are the auxiliary driving wheels. However, the invention is not limited thereto. For example, the vehicle 10 may have a structure in which power is transmitted to the rear wheels 16 all the time and the front wheels 14 are auxiliary driving wheels. For example, the vehicle 10 may be a FR-based 4WD vehicle.

In the flowcharts in FIGS. 4 and 6 according to the embodiments described above, the 2WD clutch engagement control is executed in S60 (or S63, S65, and S68) and S70 in a case where it is determined in S30 that the traveling state of the vehicle 10 has become a state subjected to a predetermined disturbance and it is determined in S50 that a transition to 4WD is not to be carried out. However, the 2WD clutch engagement control may be executed in the case of a positive disturbance determination in S30 without any determination for the transition to 4WD. In this case, S40 and S50 become inessential. The disturbance determination in S30 may be based solely on whether or not the rotation speed deviation between the right and left rear wheels 16R, 16L is equal to or greater than the predetermined rotation difference as the disturbance determination threshold instead of using the pre-defined arithmetic expressions represented by the expressions (4) to (6) described above. The determination in S30 may be limited to whether or not the traveling state of the vehicle 10 has become a state predicted to be subjected to the predetermined disturbance, instead of being the disturbance determination, and the 2WD clutch engagement control may be executed in the case of a positive disturbance prediction determination in S30. Even in this case, the differential limitation can be applied to both of the right and left rear wheels 16, with the 2WD_d state being maintained, when the traveling state of the vehicle 10 has become a state subjected to a predetermined disturbance, and the straight traveling stability can be improved without the transition to the 4WD state. Examples of the state predicted to be subjected to the predetermined disturbance include bad weather and road surface states where the predetermined disturbance is considered to be more likely. The bad weather and road surface states are determined by using, for example, bad weather determination based on the instability of radar sensor measurement in known radar cruise control, bad weather determination based on a high-speed wiper operation, bad weather determination based on the selection of a snow mode, bumpy road determination based on a value detected by the G sensor 94 or the like, and low μ road determination based on road surface μ value estimation and outside temperature measurement. The order of execution of S10, S20, and S30 in the flowcharts in FIGS. 4 and 6 may be changed as well. In this manner, the mode and order of execution of the respective Steps in the flowcharts in FIGS. 4 and 6 can be appropriately changed within an acceptable range.

In the embodiments described above, various automatic transmissions such as a planetary gear-type multi-speed transmission, a continuously variable transmission, and a synchromesh-type parallel two-shaft transmission (including a known DCT) have been described as an example of the transmission 18. However, the invention is not limited thereto. For example, the transmission 18 may be a known manual transmission and is inessential. Also, the expression (7) described above is to calculate the estimated driving force Fp on the assumption that the torque converter (not illustrated) is provided. However, in a case where the transmission 18 and the torque converter are not provided, the expression (7) may be changed to be suitable for the case.

In the embodiments described above, a gasoline engine or the like that is an internal combustion engine which generates power based on fuel combustion has been described as an example of the driving force source. However, other motors such as an electric motor can also be adopted alone or in combination with the engine.

The above description is solely about the embodiments, and it should be appreciated that the invention can be changed or modified in various manners based on the knowledge of those skilled in the art.

What is claimed is:

1. A control device for a four wheel drive vehicle, the four wheel drive vehicle including:
   a disconnection mechanism configured to connect/disconnect a first power transmission path transmitting a part of power of a driving force source transmitted to main driving wheels to auxiliary driving wheels during four wheel drive of the four wheel drive vehicle;
   a first clutch disposed in a second power transmission path between the disconnection mechanism and a left wheel of the auxiliary driving wheels; and
   a second clutch disposed in a third power transmission path between the disconnection mechanism and a right wheel of the auxiliary driving wheels,
   the control device comprising:
   an electronic control unit configured to:
   (a) switch an operation state of the disconnection mechanism, the first clutch, and the second clutch in accordance with a traveling state of the four wheel drive vehicle, and
   (b) execute a two wheel drive control for engaging or half-engaging the first clutch and the second clutch, based on the traveling state of the four wheel drive vehicle, with a two wheel drive state where the disconnection mechanism is released being maintained.

2. The control device according to claim 1, wherein the traveling state of the four wheel drive vehicle is a traveling state relating to straight traveling stability of the four wheel drive vehicle and the electronic control unit is configured to execute the two wheel drive control in a case where the traveling state relating to the straight traveling stability of the four wheel drive vehicle has become a state subjected to a predetermined disturbance or in a case where the traveling state relating to the straight traveling stability of the four wheel drive vehicle has become a state predicted to be subjected to a predetermined disturbance.

3. The control device according to claim 1, wherein the electronic control unit is configured to execute the two wheel drive control in a case where a driving demand from a driver of the four wheel drive vehicle is within a predetermined range.

4. The control device according to claim 1, wherein the electronic control unit is configured to execute the two wheel drive control by engaging or half-engaging the first clutch and the second clutch at the same time with the two wheel drive state being maintained.

5. The control device according to claim 1, wherein the electronic control unit is configured to execute the two wheel drive control by respectively engaging or half-engaging the first clutch and the second clutch, with the two wheel drive state being maintained, at clutch torques calculated based on the respective rotation speeds of the auxiliary driving wheels.

6. The control device according to claim 5,
wherein the electronic control unit is configured to execute the two wheel drive control by engaging or half-engaging one of the first clutch and the second clutch prior to the other one of the first clutch and the second clutch, and a rotation speed of the one of the auxiliary driving wheels being higher than a rotation speed of the other of the auxiliary driving wheels.

7. The control device according to claim 1,
wherein the four wheel drive vehicle further includes a transfer mechanism and a driving force transmission shaft, the transfer mechanism being configured to distribute a part of the power of the driving force source to the auxiliary driving wheels and the driving force transmission shaft being configured to transmit the power from the driving force source distributed by the transfer mechanism to the auxiliary driving wheels,
wherein the disconnection mechanism includes a third clutch and a fourth clutch, the third clutch being disposed on the driving force source side of the driving force transmission shaft and the fourth clutch being disposed on the auxiliary driving wheels side of the driving force transmission shaft, and
wherein the electronic control unit is configured to release the disconnection mechanism by releasing at least one of the third clutch and the fourth clutch.

8. The control device according to claim 7,
wherein one of the third clutch and the fourth clutch is a dog clutch,
wherein the other one of the third clutch and the fourth clutch is a dog clutch to which a synchronization mechanism is attached or a friction clutch, and
wherein the electronic control unit is configured to engage the other one of the third clutch and the fourth clutch first in a case where a transition is carried out from a state where the two wheel drive control is executed in the two wheel drive state where both the third clutch and the fourth clutch are released to a four wheel drive state where both the third clutch and the fourth clutch are engaged.

9. The control device according to claim 7,
wherein both the third clutch and the fourth clutch are dog clutches, and
wherein the electronic control unit is configured to engage the fourth clutch prior to the initiation of the two wheel drive control in a case where the two wheel drive control is executed in the two wheel drive state where both the third clutch and the fourth clutch are released.

* * * * *